US012684181B2

(12) United States Patent
Kipp et al.

(10) Patent No.: US 12,684,181 B2
(45) Date of Patent: Jul. 14, 2026

(54) METHODS, SYSTEMS, AND APPARATUSES FOR IMPROVED TRANSMISSION OF CONTENT

(71) Applicant: COMCAST CABLE COMMUNICATIONS, LLC, Philadelphia, PA (US)

(72) Inventors: Neill Kipp, Philadelphia, PA (US); Bryan Taft, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/956,248

(22) Filed: Sep. 29, 2022

(65) Prior Publication Data

US 2024/0114184 A1    Apr. 4, 2024

(51) Int. Cl.
| | |
|---|---|
| *H04N 21/235* | (2011.01) |
| *H04L 65/60* | (2022.01) |
| *H04N 21/2187* | (2011.01) |
| *H04N 21/239* | (2011.01) |
| *H04N 21/845* | (2011.01) |

(52) U.S. Cl.
CPC ..... *H04N 21/2353* (2013.01); *H04N 21/2187* (2013.01); *H04N 21/2393* (2013.01); *H04N 21/8456* (2013.01); *H04L 65/60* (2013.01)

(58) Field of Classification Search
CPC ........... H04N 21/2187; H04N 21/2353; H04N 21/2393; H04N 21/8456
See application file for complete search history.

(56) References Cited

U.S. PATENT DOCUMENTS

| | | | |
|---|---|---|---|
| 5,999,216 | A | 12/1999 | Kaars |
| 6,373,856 | B1 | 4/2002 | Higashida |
| 6,738,427 | B2 | 5/2004 | Zetts |
| 6,829,781 | B1 | 12/2004 | Bhagavath et al. |
| 7,197,758 | B1 | 3/2007 | Blackketter et al. |
| 7,403,224 | B2 | 7/2008 | Fuller |
| 7,715,475 | B1 | 5/2010 | Puri et al. |
| 9,386,066 | B2 | 7/2016 | Jarvinen et al. |
| 9,424,350 | B2 | 8/2016 | Laksono |
| 9,648,072 | B2 | 5/2017 | van Doorn et al. |
| 9,715,506 | B2 | 7/2017 | Rosen |
| 9,992,499 | B2 * | 6/2018 | Su ........................ H04N 19/142 |
| 10,504,200 | B2 | 12/2019 | Winograd |
| 11,627,349 | B2 * | 4/2023 | Park ................... H04N 21/2187 370/393 |

(Continued)

FOREIGN PATENT DOCUMENTS

| | | |
|---|---|---|
| CA | 2803759 A1 | 7/2013 |
| EP | 2387241 A1 | 5/2011 |

(Continued)

*Primary Examiner* — Kyu Chae
(74) *Attorney, Agent, or Firm* — Ballard Spahr LLP

(57) ABSTRACT

A computing device (e.g., an encoder, a content packager, and/or content server) may receive content (e.g., a live or time-shifted content transmission, video-on-demand content transmission, video, audio, games, data, etc.). The computing device may separate the received content into a plurality of content segments. The computing device may insert metadata into each of the content segments. The metadata may include a segment identifier. The segment identifier may identify the next sequential content segment of the plurality of content segments.

20 Claims, 8 Drawing Sheets

310

| Event Message Box | |
|---|---|
| type | emsg |
| size | 104 |
| flags | 0 |
| version | 1 |
| start | |
| timescale | |
| presentation_time | 0 |
| event duration | |
| id | 0 |
| message_data | content-id:12345 next-segment-bitrate-list:[8329200, 6151600,2107200,828800,571600], next-segment-number:802881357 address-of-next-segment (e.g., URL of next segment) |

335

350  340  345  355

(56)                    References Cited

U.S. PATENT DOCUMENTS

| | | | |
|---|---|---|---|
| 2002/0034255 A1 | 3/2002 | Zetts | |
| 2003/0091000 A1 | 5/2003 | Chu et al. | |
| 2004/0190855 A1 | 9/2004 | Poslinski | |
| 2005/0076390 A1 | 4/2005 | Klausberger et al. | |
| 2005/0091280 A1 | 4/2005 | Winter | |
| 2005/0190911 A1 | 9/2005 | Pare et al. | |
| 2006/0129909 A1 | 6/2006 | Butt et al. | |
| 2006/0233143 A1 | 10/2006 | Walker et al. | |
| 2007/0040933 A1 | 2/2007 | Seong | |
| 2007/0186247 A1 | 8/2007 | White et al. | |
| 2010/0011392 A1 | 1/2010 | Bronstein et al. | |
| 2010/0180043 A1 | 7/2010 | Lau et al. | |
| 2010/0235528 A1 | 9/2010 | Bocharov et al. | |
| 2011/0080940 A1 | 4/2011 | Bocharov et al. | |
| 2011/0125919 A1 | 5/2011 | Kwon et al. | |
| 2012/0246279 A1 | 9/2012 | Zang et al. | |
| 2013/0042015 A1 | 2/2013 | Begen et al. | |
| 2013/0198401 A1 | 8/2013 | van Doorn et al. | |
| 2016/0182582 A1* | 6/2016 | Wagenaar ............... | H04L 65/65 |
| | | | 709/231 |
| 2019/0262704 A1* | 8/2019 | de Witte .......... | H04N 21/23418 |
| 2020/0092342 A1* | 3/2020 | Schmelcher ....... | H04N 21/6581 |
| 2022/0217194 A1* | 7/2022 | Sodagar ................ | H04L 65/611 |
| 2023/0300185 A1* | 9/2023 | van Doorn .......... | H04N 21/435 |
| | | | 709/231 |

FOREIGN PATENT DOCUMENTS

| | | | |
|---|---|---|---|
| WO | 1999037072 | | 7/1999 |
| WO | 2010039838 A1 | | 4/2010 |

* cited by examiner

204

| Header 305 | Message Box 310 | Content Fragment N 315 | Content Fragment N+1 320 | Content Fragment N+2 325 | Content Fragment N+3 330 |
|---|---|---|---|---|---|

310

| Event Message Box | |
|---|---|
| type | emsg |
| size | 104 |
| flags | 0 |
| version | 1 |
| start | |
| timescale | |
| presentation_time | 0 |
| event duration | |
| id | 0 |
| message_data | content-id:12345 next-segment-bitrate-list:[8329200, 6151600,2107200,828800,571600], next-segment-number:802881357 address-of-next-segment (e.g., URL of next segment) |

335

350  340  345  355

400

410

RECEIVE CONTENT

420

SEPARATE THE CONTENT INTO A PLURALITY OF SEGMENTS OF THE CONTENT

430

INSERT CONTENT METADATA INTO EACH SEGMENT OF THE CONTENT

440

STORE THE SEGMENTED CONTENT

700

710

RECEIVE A FIRST SEGMENT OF THE CONTENT

720

CAUSE THE FIRST SEGMENT OF THE CONTENT TO BE DISPLAYED

730

DETERMINE INFORMATION FOR REQUESTING A SECOND SEGMENT OF THE CONTENT

740

SEND A REQUEST FOR THE SECOND SEGMENT OF THE CONTENT

METHODS, SYSTEMS, AND APPARATUSES FOR IMPROVED TRANSMISSION OF CONTENT

BACKGROUND

Content (e.g., video, audio, games, applications, data) may be provided to users in a variety of ways. As content is received by a packager, it is divided into content segments having a generally consistent temporal length or data amount. The packager also generates a manifest for the content. The manifest identifies the content (e.g., by a content identifier), a list of available bitrates for receiving the content, and the segment number for content segment available for the content. When a device (e.g., a user device) makes a request to receive the content, the content server typically sends the manifest to the requesting device. The requesting device receives the manifest and requests the content segment that the requesting device initially wants to receive.

For live streaming content (e.g., sporting events, concerts, news, weather, dramatic plays, etc.) the manifest is updated as the live streaming content is further separated into content segments. The result is that the requesting device must receive and parse an updated manifest prior to requesting each subsequent content segment, which can be as often as every two seconds. The requesting device then uses the updated manifest to request the subsequent content segment. This process requires the packager to continually generate updated manifest files, as often as every two seconds, for the entirety of the playing of the requested content.

SUMMARY

It is to be understood that both the following general description and the following detailed description are exemplary and explanatory only and are not restrictive.

A computing device (e.g., an encoder or a packager) may receive a content transmission, such as a live or time-shifted content transmission, and may separate the content into content segments. The computing device may insert content metadata into each content segment. The metadata may include one or more of a content identifier that identifies the content, a content segment identifier that identifies the next sequential content segment in chronological order, and/or one or more available bitrates that may be used to receive the next sequential content segment in chronological order. The metadata may be inserted into a portion of a header or payload, such as an event message box (e.g., a dynamic adaptive streaming over HTTP (DASH) event message box), of the content segment packet.

In response to a request for content, such as a live or time-shifted content transmission, a determination may be made of the content identifier of the most recent content segment of the requested content that is available. A response (e.g., a redirect notification, such as a response that provides or is indicative of an HTTP 302 redirect to another URL path) may be sent to the user device that includes a content identifier that identifies the content, a content segment identifier of the most recently available content segment of the content, the bitrate requested for the content and the address of the content segment (e.g., a URL or MAC address). A second request may be received for the content and may include the content segment information provided in the response. Based on the second request for the content, the requested content segment may be sent to the user device.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein.

DETAILED DESCRIPTION

Figure 1:
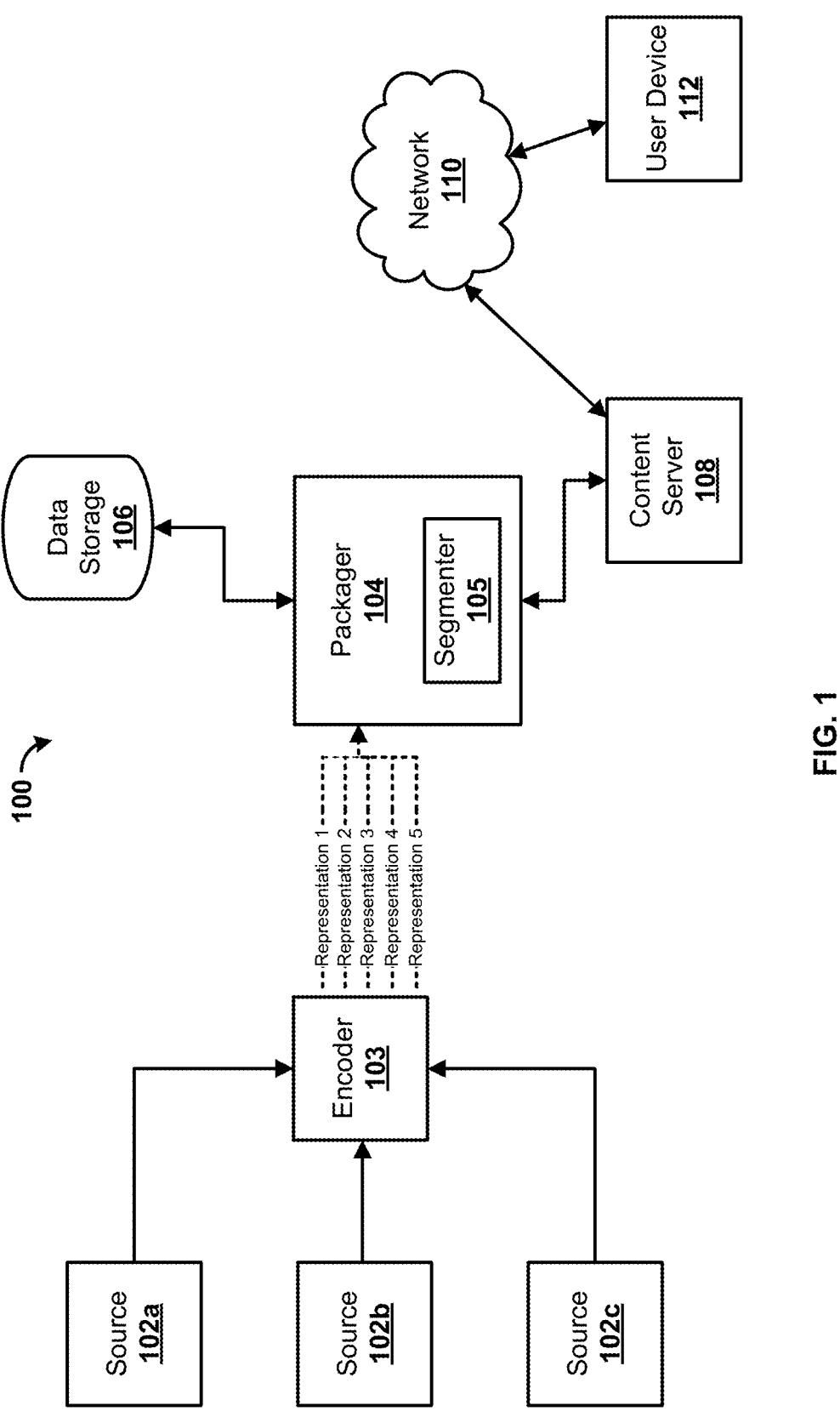
FIG. 1 shows an example system for streaming content to a user device.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Methods, systems and apparatuses are described herein for the improved transmission of content (e.g., IP linear adaptive bitrate transmission, live content transmission, and/or time-shifted content transmission). FIG. 1 shows an example system 100 for improved content transmission. The system 100 may include a plurality of computing devices/entities in communication via a network 110. The network 110 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 110 via a variety of transmission paths, including wireless paths (e.g., satellite paths, Wi-Fi paths, cellular paths, etc.) and terrestrial paths (e.g., wired paths, a direct feed source via a direct line, etc.). The network 110 may include public networks, private networks, wide area networks (e.g., Internet), local area networks, and/or the like. The network 110 may include a content access network, content distribution network, and/or the like. The network 110 may be configured to provide content from a variety of sources using a variety of network paths, protocols, devices, and/or the like. The content delivery network and/or content access network may be managed (e.g., deployed, serviced) by a content provider, a service provider, and/or the like. The network 110 may deliver content items from a source(s) to a user device(s).

The system 100 may include one or more source 102a-c, each of which may be a server or other computing device. Each source 102a-c may receive source content for a plurality of content items. The source content transmissions may be live or time-shifted content transmissions (e.g., a linear or time-shifted content transmissions) and/or video-on-demand (VOD) transmissions. The live content transmissions may include, for example, low-latency ("LL") live streams. Each source 102a-c may receive source content transmissions from an external server or device (e.g., a stream capture source, a data storage device, a media server, etc.). Each source 102a-c may receive the source content via a wired or wireless network connection, such as the network 110 or another network (not shown).

Each source 102a-c may include a headend, a video-on-demand server, a cable modem termination system, and/or the like. Each source 102a-c may provide content (e.g., video, audio, games, applications, data) and/or content items (e.g., video, streaming content, movies, shows/programs, etc.) to user devices. Each source 102a-c may provide streaming media, such as live content, on-demand content (e.g., video-on-demand), content recordings, and/or the like. Each source 102a-c may be managed by third-party content providers, service providers, online content providers, over-the-top content providers, and/or the like. A content item may be provided via a subscription, by individual item purchase or rental, and/or the like. Each source 102a-c may be configured to provide content items via the network 110. Content items may be accessed by user devices via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

Each source 102a-c may provide uncompressed content items, such as raw video data, comprising one or more portions (e.g., frames/slices, groups of pictures (GOP), coding units (CU), coding tree units (CTU), etc.). It should be noted that although three sources 102a-c are shown in FIG. 1, this is not to be considered limiting. In accordance with the described techniques, the system 100 may comprise a plurality of sources 102, each of which may receive any number of source content transmissions.

The system 100 may include one or more encoders 103, such as a video encoder, a content encoder, etc. The encoder 103 may be configured to encode one or more source content transmissions (e.g., received via one of the sources 102a-c)

into a plurality of content items/streams at various bitrates (e.g., various representations). For example, the encoder 103 may be configured to encode a source content transmission for a content item at varying bitrates for corresponding representations (e.g., versions) of a content item for adaptive bitrate streaming. As shown in FIG. 1, the encoder 103 may encode a source content transmission into Representations 1-5. It is to be understood that the FIG. 1 shows five representations for explanation purposes only. The encoder 103 may be configured to encode a source content trans- mission into fewer or greater representations. Representa- tion 1 may be associated with a first resolution (e.g., 480p) and/or a first bitrate (e.g., 4 Mbps). Representation 2 may be associated with a second resolution (e.g., 720p) and/or a second bitrate (e.g., 5 Mbps). Representation 3 may be associated with a third resolution (e.g., 1080p) and/or a third bitrate (e.g., 6 Mbps). Representation 4 may be associated with a fourth resolution (e.g., 4K) and/or a fourth bitrate (e.g., 10 Mbps). Representation 5 may be associated with a fifth resolution (e.g., 8K) and/or a fifth bitrate (e.g., 15 Mbps). Other examples resolutions and/or bitrates are pos- sible.

The encoder 103 may be configured to determine one or more encoding parameters. The encoding parameters may be based on one or more content transmissions encoded by the encoder 103. For example, an encoding parameter may comprise at least one of an encoding quantization level (e.g., a size of coefficient range for grouping coefficients), a predictive frame error, a relative size of an inter-coded frame with respect to an intra-coded frame, a number of motion vectors to encode in a frame, a quantizing step size (e.g., a bit precision), a combination thereof, and/or the like. As another example, an encoding parameter may comprise a value indicating at least one of a low complexity to encode, a medium complexity to encode, or a high complexity to encode. As a further example, an encoding parameter may comprise a transform coefficient(s), a quantization param- eter value(s), a motion vector(s), an inter-prediction param- eter value(s), an intra-prediction parameter value(s), a motion estimation parameter value(s), a partitioning param- eter value(s), a combination thereof, and/or the like. The encoder 103 may be configured to insert encoding param- eters into the content transmissions and/or provide encoding parameters to other devices within the system 100.

Encoding a content transmission/item may comprise the encoder 103 partitioning a portion and/or frame of the content transmission/item into a plurality of coding tree units (CTUs). Each of the CTUs may comprise a plurality of pixels. The CTUs may be partitioned into coding units (CUs) (e.g., coding blocks). For example, a content item may include a plurality of frames (e.g., a series of frames/ pictures/portions, etc.). The plurality of frames may com- prise I-frames, P-frames, and/or B-frames. An I-frame (e.g., an Intra-coded picture) may include and/or represent a complete image/picture. A P-frame (e.g., a Predicted picture/ delta frame) may comprise only the changes in an image from a previous frame. For example, in a scene where a person moves across a stationary background, only the person's movements need to be encoded in a corresponding P-frame in order to indicate the change in the person's position with respect to the stationary background. To save space and computational resources, the encoder 103 may not store information/data indicating any unchanged back- ground pixels in the P-frame. A B-frame (e.g., a Bidirec- tional predicted picture) may enable the encoder 103 to save more space and computational resources by storing differ- ences between a current frame and both a preceding and a following frame. Each frame of a content item may be divided into a quantity of partitions. Each partition may comprise a plurality of pixels. Depending on a coding format (e.g., a CODEC), the partition may be a block, a macrob- lock, a CTU, etc. The order in which I-frames, P-frames, and B-frames are arranged is referred to herein as a Group of Pictures (GOP) structure—or simply a GOP. The encoder 103 may encode frames as open GOPs or as closed GOPs.

While the description herein refers to the encoder 103 encoding entire frames of content, it is to be understood that the functionality of the encoder 103 may equally apply to a portion of a frame rather than an entire frame. A portion of a frame, as described herein, may comprise one or more coding tree units/blocks (CTUs), one or more coding units/ blocks (CUs), a combination thereof, and/or the like. For example, the encoder 103 may allocate a time budget for encoding at least a portion of each frame of a content item. When the 103 encoder takes longer than the allocated time budget to encode at least a portion of a given frame(s) of the content item at a first resolution (e.g., for Representation 5), the encoder 103 may begin to encode frames of the content item—or portions thereof—at a second resolution (e.g., a lower resolution/bitrate, such as Representations 1-4) in order to allow the encoder 103 to "catch up." As another example, when the encoder 103 takes longer than the allocated time budget to encode at least a portion of at least one frame for the first representation of the content item at the first resolution, the encoder 103 may use content-aware encoding techniques when encoding further frames—or portions thereof—for the first representation. The content- aware encoding techniques may comprise, as an example, adaptive resolution changes, reference picture resampling, etc. The encoder 103 may use the content-aware encoding techniques to "reuse" encoding decisions for corresponding frames that were previously encoded for the second repre- sentation at the second resolution.

The system 100 may include a packager 104. The pack- ager 104 may be configured to receive one or more content items/streams from the encoder 103. The packager 104 may be configured to prepare content items/streams for distribu- tion. For example, the packager 104 may be configured to convert encoded content items/streams into a plurality of content fragments. For example, the packager 104 may include a segmenter 105. The packager 104 may also include (or have access to) a data storage device 106. The segmenter 105 may divide a set of encoded streams into media/content segments. For example, the segmenter 105 may receive a target segment duration. The target duration may be, for example, approximately two thousand milliseconds. The target segment duration may be a preset amount or received via user input. Alternately, the target segment duration may be dynamically determined based on properties of the encoded source content transmission or the packager 104. For example, if the target segment duration is two seconds, the segmenter 105 may process the incoming encoded streams and break the encoded streams into segments at key frame boundaries approximately two seconds apart. Further, if the encoded streams include separate video and audio streams, the segmenter 105 may generate the segments such that the video and audio streams are timecode aligned.

The packager 104 may be configured to support multiple content segmentation types. The segmenter 105 may be configured to generate segments for each of the content segmentation types supported by the packager 104. Seg- ments may alternately be referred to as "chunks." The packager 104 may be configured to support both multiplexed segments (video and audio data included in a single multiplexed stream) and non-multiplexed segments (video and audio data included in separate non-multiplexed streams). Further, in the case of MPEG-DASH, the packager 104 may be configured to support container formats in compliance with international standards organization base media file format (ISOBMFF), associated with a file extension ".m4s"), motion picture experts group 2 transport stream (MPEG-TS), extensible binary markup language (EBML), WebM, Matroska, or any combination thereof.

The segmenter 105 may be configured to employ a "smart" storage system to avoid replicating audio/video data when generating segments for each content segmentation type. In one example, if the packager 105 supports N content segmentation types (where N is an integer greater than zero), the segmenter 105 may generate N segment templates for each segment (e.g., two second portion) of each of the encoded streams. Each segment template may comprise header information associated with a content segmentation type, data indicating a start position or start time of the segment in the source content transmission, and data indicating an end position or end time of the segment in the source content transmission. Thus, in the case of MPEG-DASH, different segment templates may be generated for ISOBMFF multiplexed ("muxed"), ISOBMFF non-multiplexed ("demuxed"), MPEG-TS muxed, MPEG-TS demuxed, EBML muxed, EBML demuxed, etc. In an embodiment, each of the segment templates may not include the underlying audio/video data of the corresponding segment. Thus, even though multiple segment templates may be generated for each segment of the source content transmission, the underlying segment audio/video data may be stored once in the storage device 106.

As the segments are generated, the segmenter 105 may insert metadata into each of the segments. For example, the segmenter 105 may insert the metadata into one or more event message boxes embedded into the segment. For example, the metadata may include one or more of the next segment number, the next segment time period, or the list of available bitrates for the next segment in time/order after the segment in which the metadata is inserted.

The packager 104 may be configured to provide content items/streams according to adaptive bitrate streaming. For example, the packager 104 may be configured to convert encoded content items/streams at various representations into one or more adaptive bitrate streaming formats, such as Apple HTTP Live Streaming (HLS), Microsoft Smooth Streaming, Adobe HTTP Dynamic Streaming (HDS), MPEG DASH, and/or the like. The packager 104 may pre-package content items/streams/transmissions and/or provide packaging in real-time as content items/streams/transmissions are requested by user devices, such as a user device 112. The user device 112 may be a content/media player, a set-top box, a client device, a smart device (e.g., smart phone, smart watch, tablet, etc.), a computing device (e.g., laptop computer, desktop computer, etc.), a mobile device, a user device, etc.

The system 100 may include a content server 108. For example, the content server 108 may be configured to receive requests for content, such as content items/streams/transmissions from the user device 112. The content server 108 may identify a location of a requested content item and provide the content item, or a portion thereof, to a device requesting the content, such as the user device 112. The content server 108 may comprise a Hypertext Transfer Protocol (HTTP) Origin server. The content server 108 may be configured to provide a communication session with a requesting device, such as the user device 112, based on HTTP, FTP, or other protocols. The content server 108 may be one of a plurality of content servers distributed across the system 100. The content server 108 may be located in a region proximate or local to the user device 112. A request for a content transmission/item from the user device 112 may be directed to the content server 108 (e.g., due to the location and/or network conditions). The content server 108 may be configured to deliver content transmissions/items to the user device 112 in a specific format requested by the user device 112. The content server 108 may be configured to provide the user device 112 with a manifest file (e.g., or other index file describing portions of the content) corresponding to a content transmission/item. The content server 108 may be configured to provide a streaming transmission of content (e.g., unicast, multicast), such as live-streamed content or time-shifted transmissions of content) to the user device 112. The content server 108 may be configured to provide a file transfer and/or the like to the user device 112. The content server 108 may cache or otherwise store content (e.g., frequently requested content) to enable faster delivery of content items to users.

The content server 108 may receive a request for a content item, such as a request for high-resolution video and/or the like. The content server 108 may receive the request for the content item from the user device 112. As further described herein, the content server 108 may be capable of sending (e.g., to the user device 112) one or more portions of the content item at varying bitrates (e.g., representations 1-5). For example, the user device 112 (or another device of the system 100) may request that the content server 108 send Representation 1 based on a first set of network conditions (e.g., lower-levels of bandwidth, throughput, etc.). As another example, the user device 112 (or another device of the system 100) may request that the content server 108 send Representation 5 based on a second set of network conditions (e.g., higher-levels of bandwidth, throughput, etc.). The content server 108 may receive encoded/packaged portions of the requested content item from the packager 104 and send (e.g., provide, serve, transmit, etc.) the encoded/packaged portions of the requested content item to the user device 112.

Figure 2:
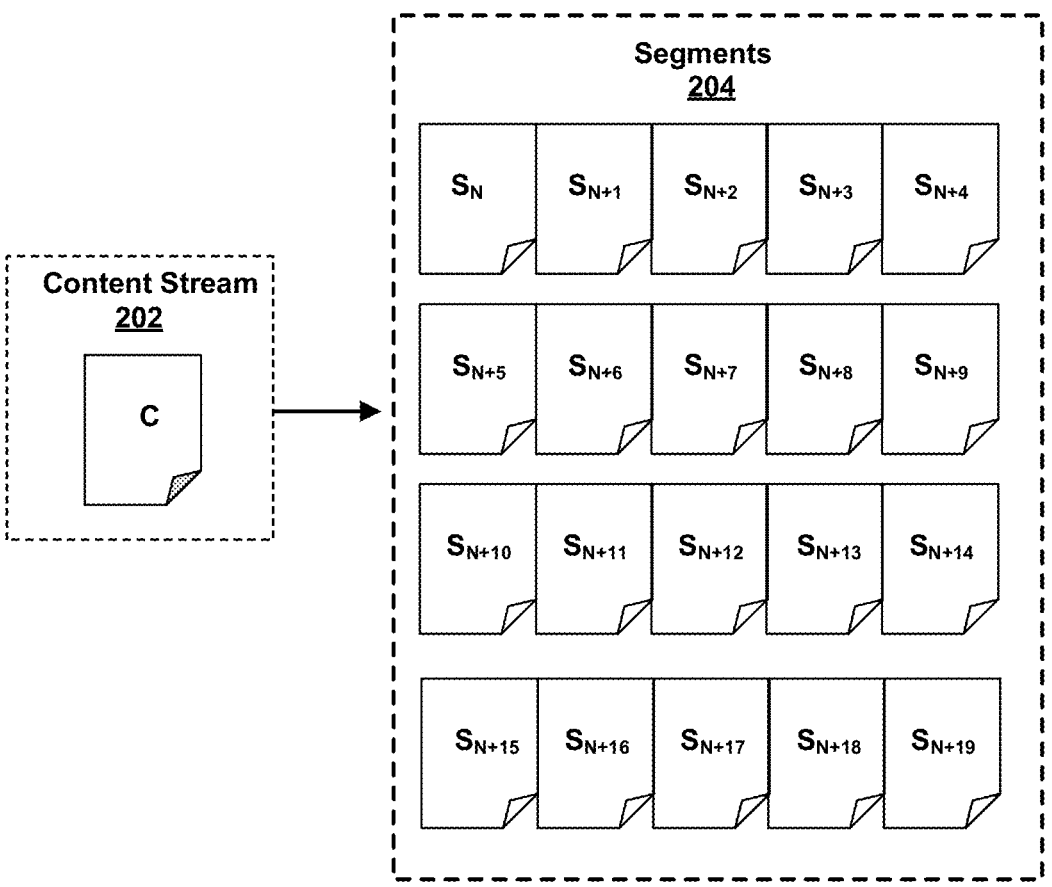
FIG. 2 shows a block diagram of an example segmentation of a content transmission.

FIG. 2 shows a block diagram 200 of an example segmentation of an encoded content transmission 202. For example, the packager 104 may segment the encoded content transmission 202. The encoded content transmission 202 may be received by the packager 104. The encoded content transmission 202 may be a continuous stream received from the encoder 103 or one of the content sources 102a-c. The segmenter 105 of the packager 104 may generate multiple content segments $S_N$-$S_{N+19}$ 204. Each segment 204 may have a duration of approximately two thousand milliseconds or any other target duration set for the packager 104. For example, the segmenter 105 may process the incoming encoded content transmission 202 and break the encoded stream 202 into segments 204 at key frame boundaries at or approximately two seconds apart. Further, if the encoded content transmission 202 includes separate video and audio streams, the segmenter 105 may generate two groups of segments 204 such that the video and audio streams are timecode aligned.

Figures 3A, 3B:
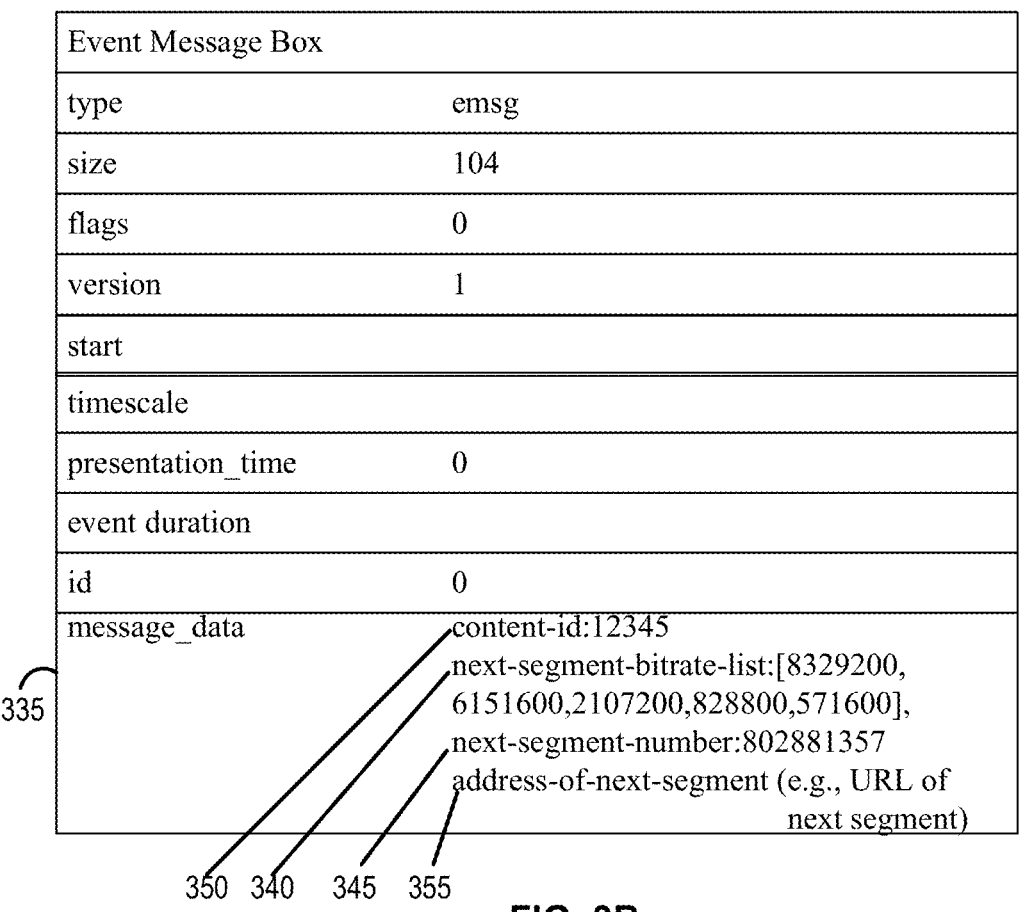
FIG. 3A shows an example content segment.
FIG. 3B shows an example event message box within or associated with a packet of the content segment.

FIG. 3A shows an example of a content segment 204. For example, the content segment 204 may be a packet, such as an MPEG packet. The packet of the content segment 204 may include a packet header 305. The packet header 305 may identify the start of the content segment 204. The packet header 305 may include a content identifier that identifies the content 202 and a time stamp that identifies when the packet of the content segment 204 was generated.

The packet of the content segment 204 may also include a box, container, portion, or section (e.g., of the header or the payload), such as a message box 310 (e.g., an event message box, MPEG-DASH event message box, etc.). The message box 310 may be configured to receive metadata related to the content segment 204. For example, the message box 310 may be configured to receive or otherwise include one or more of a content identifier that identifies the content 202, a content segment identifier that identifies the next chronologically sequential segment 204 of the content 202, or one or more available bitrates (e.g., all of the available bitrates) for receiving and viewing the next chronologically sequential content segment 204. For example, the content segment identifier may comprise a content segment number, a full or partial uniform resource locator (URL) or other address, or another unique identifier. The message box 310 may also include any one or more of digital rights management metadata, codec compression data, audio codec compression data, advertising signaling, etc.

FIG. 3B shows an example event message box 310 within the packet of the content segment 204. The event message box 310 may include a plurality of fields. At least a portion of those fields are shown in FIG. 3B. However, those or ordinary skill in the art will recognize that additional fields for providing additional information or metadata may be included in other examples of the event message box 310. For example, the event message box 310 may include one or more of a type field, a size field, a flags field, a version field, a start field, a timescale field, a presentation time field, an event duration field, an ID field, and a message data field 335. The type field may provide information identifying the type of message box (e.g., an event message box, MPEG-DASH event message box, etc.). The size field indicates the number of bytes in the message data. The version field indicates the version of the type of event message box being used. The start field may provide time data and may be used when the message in the message data field 335 is to be displayed at a particular point in time in this content segment 204 or another content segment 204 of the content 202. The timescale field lists the timescale for the presentation time field and the event duration time field of the message box 310. The presentation time field indicates the time the event in the message data field 335 begins. The duration field indicates the duration of the event indicated in the message data field 335. The ID field indicates the instance of the message data in the message data field 335.

The message data field 335 may include all or a portion of the metadata for the content segment 204. In certain examples, the packet of the content segment 204 may include multiple message boxes 310 and the metadata for the content segment 204 may be separated and included in one of the plurality of message boxes 310. For example, the message data field 335 may include a content identifier 350 that identifies the content 202, a content segment identifier 345 that identifies the next chronologically sequential segment 204 of the content 202, one or more available bitrates 340 (e.g., all of the available bitrates) for receiving and viewing the next chronologically sequential content segment 204, or one or more addresses 355 (e.g., URL, MAC address) for the next segment of the content 202. The message data field (or another message data field in another event message box 310 may also include any one or more of digital rights management metadata, codec compression data, audio codec compression data, advertising signaling, etc.

Returning to FIG. 3A, the packet of the content segment 204 may also include a plurality of content fragments 315-330. Each content fragment 315-330 may include a portion of the content in sequential order. One or more of the content fragments 315-330 may include video content, audio content, or data content.

Figure 4:
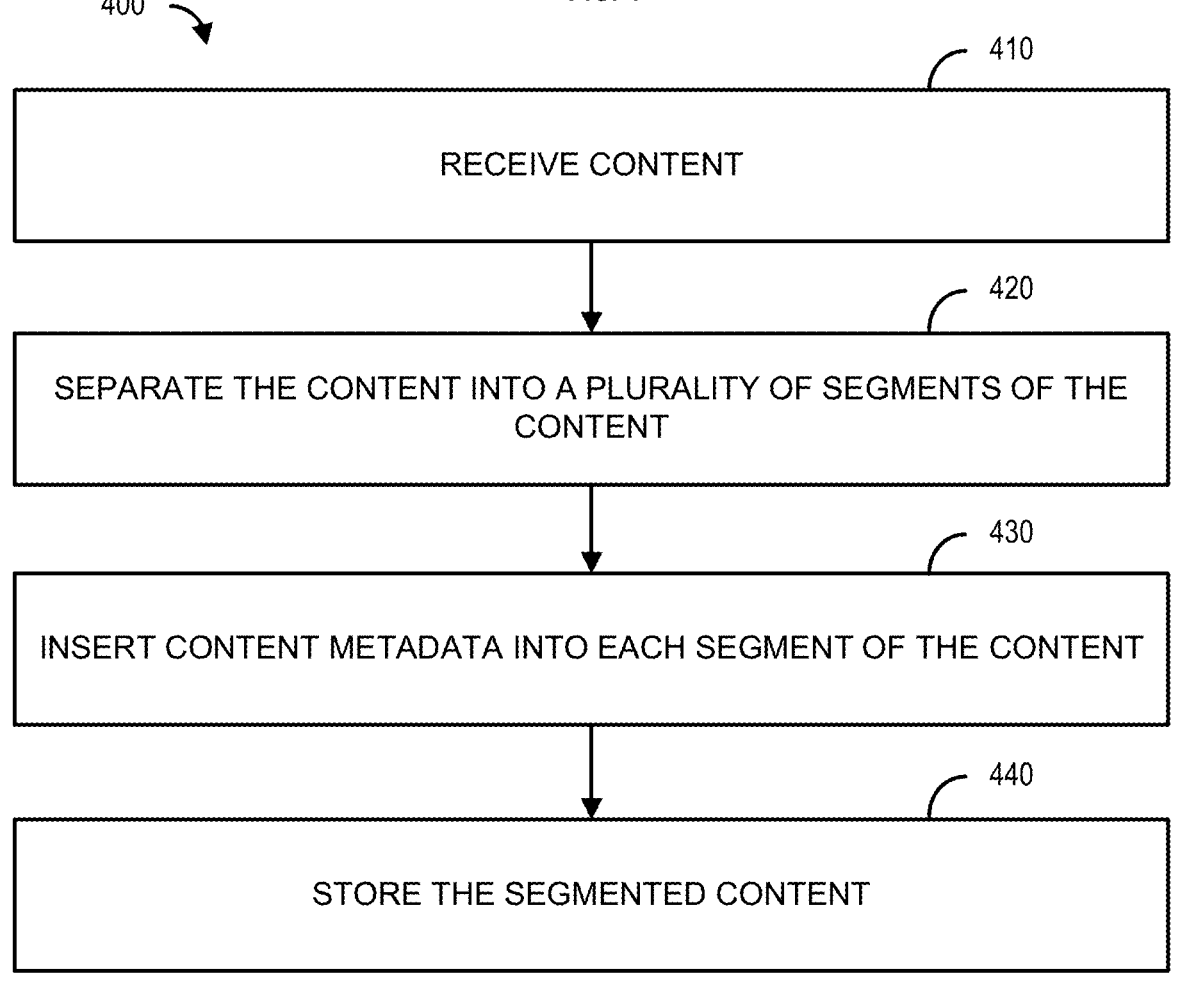
FIG. 4 shows a flowchart of an example method for segmenting streaming content.

FIG. 4 is a flowchart of an example method 400 for segmenting content by a computing device (e.g., the encoder 103 or the packager 104). For example, the packager 104 may include or be communicably coupled to at least one encoder 103 and at least one source of content (e.g., content sources 102a-c). The packager 104 may also include, be included in, or be communicably coupled to a content server 108 for receiving request for content and sending requested content to one or more user devices (e.g., user device 112).

At 410, a computing device (e.g., the encoder 103 or the packager 104 (e.g., a linear packager)) may receive content. For example, the content may be streaming content. For example, the content may be a live stream of content (e.g., a sporting event, news, weather, traffic, a concert, etc.) or on-demand content (e.g., content previously stored and sent to a user when the user requests the content) (e.g., a movie, an episode of a television show, etc.). For example, the content may be a continuous feed of live stream content. For example the content may be encoded streaming content or unencoded streaming content. The encoded streaming content may be received from the encoder 103 or from one of the content sources 102a-c. The unencoded streaming content may be received from one of the content sources 102a-c and may be encoded by an encoder internal to or otherwise associated with the packager 104.

At 420, the computing device (e.g., the encoder 103 or a segmenter 105 of the packager 104) may separate the content (e.g., content 202) into a plurality of content segments (e.g., segments 204). Each content segment 204 may include a portion of the content 202. For example, each content segment 204 may be separated into a content segment having a predetermined data size or time duration. For example, the segmenter 105 may have a target segment duration of two thousand milliseconds (or another desired length of duration, such as any time period between 0-20 seconds). The target segment duration may be a preset amount, received via user input, or dynamically determined based on properties of the encoded source content transmission or the packager 104. For example, if the target segment duration is two seconds, the segmenter 105 may process the incoming content transmission and break the content transmission 202 into segments 204 at key frame boundaries approximately two seconds apart. Further, if the content transmission 202 includes separate video and audio streams, the segmenter 105 may generate the content segments 204 such that the separate content segments of video and audio streams are timecode aligned.

The segmenter 105 of the packager 104 may separate the content transmission of the content 202 into sequential content segments 204 in chronological order of the content transmission. For example, with reference to FIG. 2, segment $S_N$ may be the time duration 0-2 seconds of the content 202, segment $S_{N+1}$ may be time duration 2.01-4 seconds of the content 202, segment $S_{N+2}$ may be time duration 4.01-6 seconds of the content 202 and so on.

The segmenter 105 of the packager 104 may assign a unique content segment identifier to each content segment 204 (e.g., segments $S_N$-$S_{N+19}$) of the plurality of segments created. For example, the unique content segment identifier may be or include a segment number. For example, the segmenter 105 may initiate a counter associated with the particular stream of content 202 (e.g., starting the counter at 0 or 1) and increment the counter for each segment 204 that is created from the stream of content 202. In other examples, the unique content segment identifier may be a full or partial URL address, another form of counter variable, or another unique identifier.

The packager 104 (e.g., the segmenter 105) may also determine the available bitrate representations for viewing each generated segment 204 of the content 202. For example, multiple bitrate representations for the content 202 may be generated. Each representation of the content at a different bitrate may include a corresponding plurality of content segments 204 for displaying the content 202 at that particular bitrate. For example, Representation 1 may be associated with a plurality of content segments 204 of the content 202 at a first bitrate (e.g., 4 Mbps). Representation 2 may be associated with a second plurality of content segments 204 of the content 202 at a second bitrate (e.g., 5 Mbps). Representation 3 may be associated with a third plurality of content segments 204 of the content 202 at a third bitrate (e.g., 6 Mbps). Representation 4 may be associated with a fourth plurality of content segments 204 of the content 202 at a fourth bitrate (e.g., 10 Mbps). Representation 5 may be associated with a fifth plurality of content segments 204 of the content 202 at a fifth bitrate (e.g., 15 Mbps).

At 430, the computing device (e.g., the encoder 103 or the packager 104) may insert content metadata into each segment 204 of the plurality of segments of the content 202. By inserting or appending certain metadata to each content segment, the need for a computing device (e.g., an encoder or a packager) to generate updated manifests of the content as the content segments are being created may be reduced or eliminated. In addition, the need for a requesting device (e.g., a user device) to continually receive updated manifests and to parse the updated manifests to determine the next content segment of the content to request may also be reduced or eliminated. For example, the metadata may include a content identifier that identifies the content 202. The metadata may include, for example, a content segment identifier identifying the next sequential content segment of the plurality of content segments 204. For example, the content segment identifier may comprise a segment number for the next chronologically sequential segment 204 of the content 202. For example, the content segment identifier may include a full or partial uniform resource locator (URL) or other address or another form of unique identifier for the content segment 204. For example, the metadata may include the one or more available bitrates for receiving and viewing the next sequential content segment 204. For example, the metadata may include all of the available bitrates provided by the packager 104 and/or content server 108 for receiving and viewing the next sequential content segment 204. By providing the segment number and one or more available bitrates of the next sequential content segment 204 in the current content segment 204, a computing device (e.g., the user device 112) may be able to determine information of the next sequential content segment 204 and request the next sequential content segment 204. The metadata may be inserted into the content segment 204 of the content. For example, the metadata may be inserted into a message box for the content segment 204. For example, the metadata may be inserted into an event message box of the content segment 204, such as a MPEG-DASH event message box. For example, the content identifier may be inserted into the event message box in the form of: content-id:12345. For example, the content segment identifier identifying the next sequential content segment 204 may be inserted into the event message box in the form of: next-segment-number: 802881357. For example, the available bitrates for the next sequential content segment 204 may be inserted into the event message box in the form of next-segment-bitrate-list: [8329200,6151600,2107200,828800,571600] and provides, for example, five possible bitrate options to choose from.

At 440, each content segment 204 of the content 202 may be stored. For example, each content segment 204 may be stored in a data storage device (e.g., data storage 106) for subsequent retrieval by a computing device (e.g., the content server 108. For example, only a certain number of content segments 204 or certain period of time of content segments 204 may be stored for each content transmission 202 (e.g., a live or time-shifted content transmission). For example, two minutes worth of content segments 204 for the content transmission 202 may be stored within the data storage 108. In other examples, another period of time greater or lesser than two minutes worth of content segments 204 may be used as the storage limit for the content segments 204 of each content transmission 202. As a new content segment 204 is created from the content transmission 202 the oldest content segment within the predetermined period of time or number of segments may be deleted from the data storage to maintain a most current listing of content segments 204 created from the content transmission 202 (e.g., a live or time-shifted content transmission).

Figure 5:
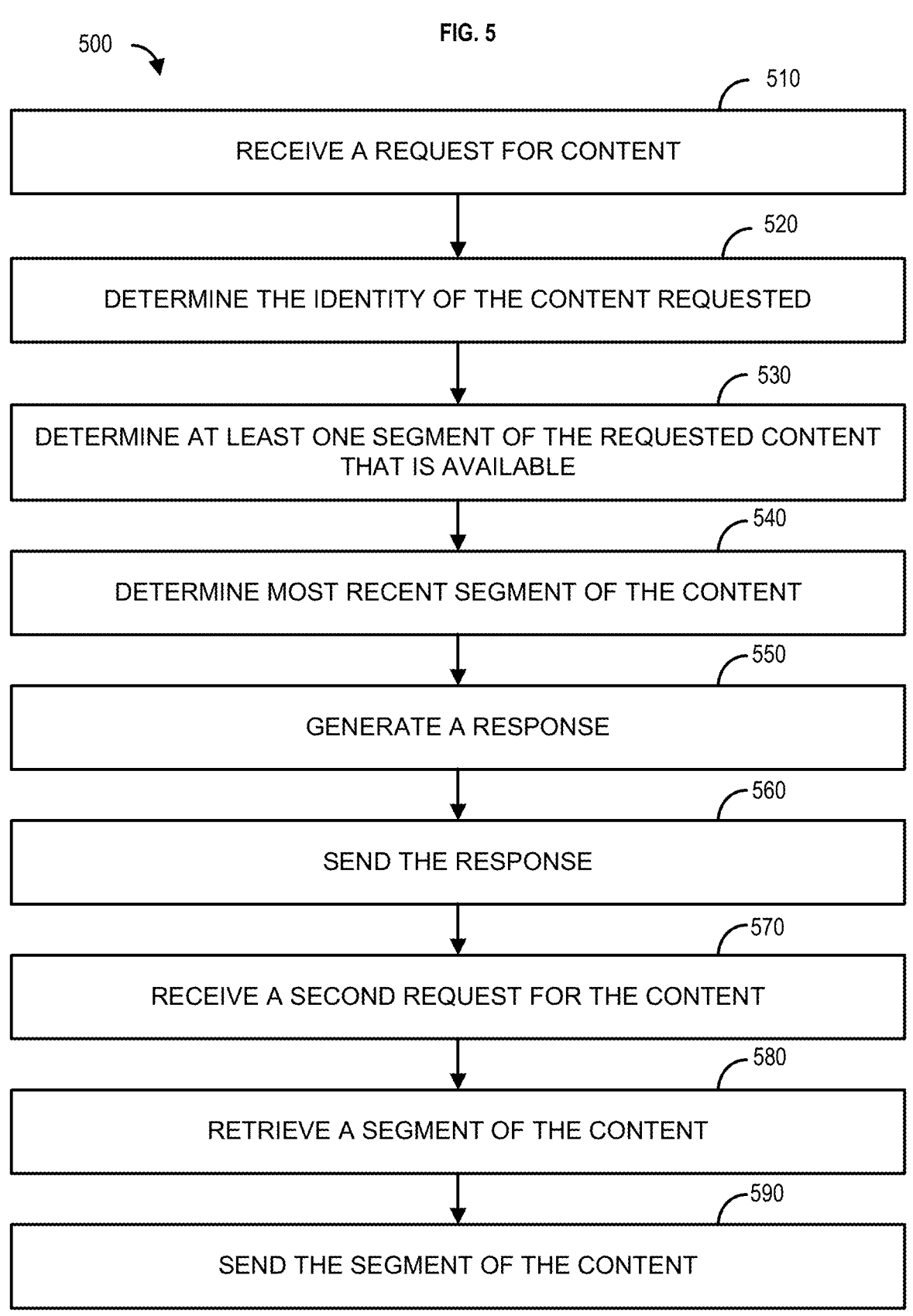
FIG. 5 shows a flowchart of an example method for responding to content requests for streaming content.

FIG. 5 shows a flowchart of an example method 500 for responding to content requests for content 202 (e.g., a live or time-shifted content transmission). At 510, a computing device (e.g., the content server 108) receives a request for content 202. The request may be received from a user device 112 via the network 110. For example, the request may be in the form of an initializing URL address that identifies the content being requested (e.g., using a content identifier) and the initial bitrate for the content being requested by the user device 112. For example, the request for content may include an address for the content 202 in the format of http://[origin-fqdn]/[content-identifier]/[segment-bitrate]/.

At 520, a computing device (e.g., the content server 108) may determine the identity of the content requested (e.g., a live or time-shifted content transmission). For example, the content server 108 may determine the content requested (e.g., one or more content items that may be a live content transmission, a time-shifted content transmission, or another form of content transmission) based on the information received in the request from the user device 112 (e.g., the URL address). For example, the content server 108 may identify the content identifier for the content 202 in the request (e.g., by parsing the request) from the user device 112. In another example, the content server 108 may identify the content 202 by determining content located at the URL address in the received request. For example, the content server 108 may also determine the bitrate being requested for the content 202. For example, the content server 108 may determine the bitrate of the content 202 being requested based on information received in the request from the user device 112 (e.g., the URL address). For example, the content server 108 may identify a bitrate in the request (e.g., by parsing the request) from the user device 112. In another example, the content server 108 may identify the bitrate by determining the content located at the URL address in the received request.

At 530, a computing device (e.g., the content server 108) may determine at least one segment 204 of the requested content 202 that is available for sending to the requesting device (e.g., the user device 112). For example, the content server 108 may evaluate the one or more content transmissions 202 (e.g., live or time-shifted content transmissions) being received by the packager 104 and stored in content segments 204 in a data storage device (e.g., the data storage device 106). For example, the content server 108 may determine the at least one segment 204 of the requested content 202 based on the identity of the content requested. For example, the content server 108 may determine content segments 204 that have a content identifier that matches the content identifier for the content requested by the user device 112. For example, the content server 108 may determine content segments 204 that are associated with the URL address received by the user device 112. The at least one content segment 204 may be for content that is provided at the bitrate requested in the request from the user device 112. For example, the at least one content segment 204 may be limited to content segments 204 for the content 202 that are provided at the requested bitrate and may not include content segments 204 for the requested content 202 that are provided at a bitrate that is different from the requested bitrate.

At 540, a computing device (e.g., the content server 108) may determine the most recently created content segment 204 of the requested content 202. The determination may be based on the at least one content segment 204 of the requested content 202 that was determined to be available. For example, separating the streaming content 202 (e.g., a live stream of content) into content segments 204, may be completed in chronological order as the portions of the content transmission 202 are being received by the packager. As such, the last content segment 204 to be created by the packager 104 may be the most recent portion of the content transmission to be received by the packager 104 (e.g., the most recent portion of the transmission that is ready to be transmitted to the requesting device, such as the user device 112. The content server 108 may evaluate the content segments 204 stored in a storage device (e.g., the storage device 106) to determine the most recently (chronologically) created content segment 204 of the requested content 202 at the requested bitrate. For example, the content server 108 may determine the most recently created content segment 204 based on the segment numbers for the identified at least one content segment 204 of the requested content 202. For example, the content server 108 may determine the most recently created content segment 204 based on the time that each content segment 204 of the at least one content segment 204 was stored in the data storage device 106. For example, the content server 108 may determine the most recently created content segment 204 based on other metadata for the content 202, such as the time sequence that the content segment 204 is positioned within the content 202. In other examples, any other stored content segment 204 for the requested content 202 may be determined by the content server 108. The content server 108 may determine a URL address, storage location, or other identifier associated with the most recent content segment 204 of the content 202. For example, the URL address may identify or otherwise be associated with an indication of the storage location of the most recent content segment 204 for the content 202 at the requested bitrate.

At 550, a computing device (e.g., the content server 108) may generate a response (e.g., a redirect notification, such as a response that provides or is indicative of an HTTP 302 redirect to another URL path (e.g., the address for the storage location associated with the most recent content segment 204 of the content 202). For example, the response may be generated based on the received request for content

202 (e.g., a live or time-shifted content transmission) from the requesting device (e.g., the user device 112). For example, the response may be generated based on determining the most recent content segment 204 or another content segment 204 of the content 202. For example, the response may include the URL address, storage location, or other identifier associated with the most recent content segment 204 or another content segment 204 of the content 202. For example, the response may be any one or more of a HyperText Transfer Protocol (HTTP) 302 redirect notification, an HTTP 303 redirect notification, or an HTTP 307 redirect notification. For example, the redirect notification may take the form of an HTTP 302 redirect notification as follows: "HTTP/1.1 302 Found" and the URL address, storage location, or other identifier associated with and/or identifying the location of the most recent content segment may take the form of: "Location: /[content-identifier]/[segment-bitrate]/[segment-number].mp4". At 560, the computing device (e.g., the content server 108) may send or otherwise transmit the response to the requesting device (e.g., the user device 112).

At 570, a computing device (e.g., the content server 108) may receive a second request for content 202. The second request for content may be received from a requesting device (e.g., the user device 112) via the network 110. The second request for the content may be associated with the request for content at 510. The second request for content may be received based on sending the response to the first request to the user device 112. The second request for content may include the URL address, storage location, or other identifier associated with the most recent content segment 204 or another content segment 204 of the requested content 202. For example, the URL address, storage location, or other identifier may identify the location for retrieving the most recent content segment 204 or another content segment 204 of the content 202 at the requested bitrate received in the content request at 510. For example, the second request for content 202 may include an address for the most recent segment of the content 202 in the format of http://[origin-fqdn]/[content-identifier]/[segment-bitrate]/[segment-number].mp4.

At 580, a computing device (e.g., the content server 108) may retrieve a content segment 204 of the requested content 204. The content segment 204 may be at the bitrate requested by the user device 112 for the requested content 202. The content server 108 may retrieve or receive the content segment 204 from the packager 104 of a data storage device (e.g., the data storage device 106). The content segment 204 may be retrieved or received based on the second request for the content 202. For example, the content segment 204 may be retrieved or received by the content server 108 based on the URL address, storage location, or other identifier in the second request for content. For example, the URL address, storage location, or other identifier may identify the storage location of the most recent content segment 204 or another content segment 204 within the data storage device 106.

At 590, a computing device (e.g., the content server 108) may send or otherwise transmit the requested content segment 204 for the requested content 202 at the requested bitrate to the requesting device (e.g., the user device 112) for the second request for the content 202. For example, the content server 108 may send or otherwise transmit the requested content segment to the user device 112 via the network 110.

Figure 6:
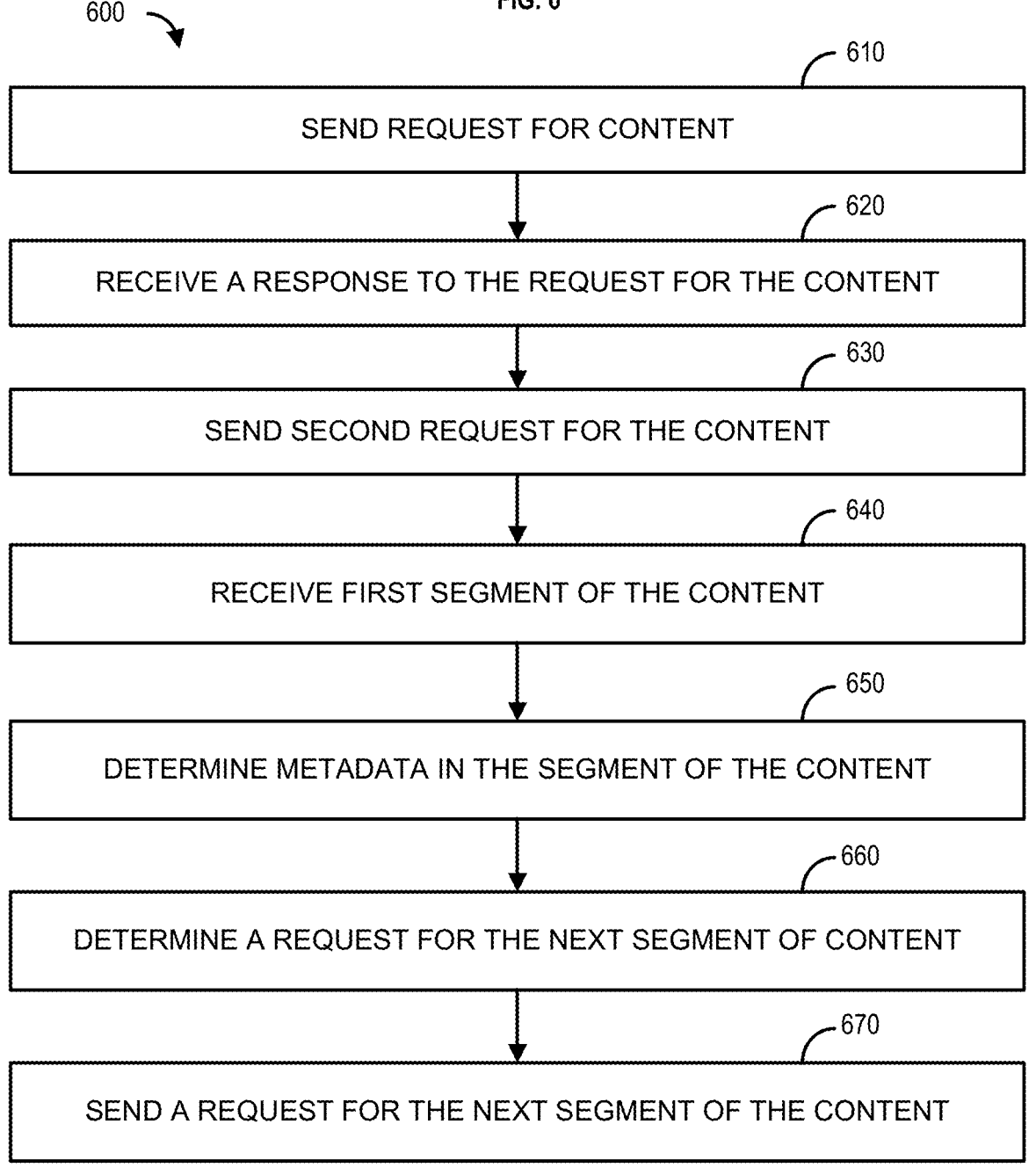
FIG. 6 shows a flowchart of an example method for determining a next segment of a content transmission to request.

FIG. 6 shows a flowchart of an example method 600 for determining a next content segment 204 of content 202 to request. For example, the content 202 (e.g., one or more content items, programs, shows, etc.) may be a live or time-shifted content transmission (e.g., sporting event, concert, news, weather, etc.). The content 202 may be available to receive and display at one or a plurality of bitrates at a requesting device (e.g., the user device 112). The content 202 may be partitioned or separated into a plurality of content segments for sending or otherwise transmitting by a computing device (e.g., the content server 108) to the user device 112.

At 610, a requesting device (e.g., the user device 112) may send a request for content 202. The request for content 202 may be sent or otherwise transmitted by the user device 112 via the network 110 to a computing device (e.g., the content server 108). For example, the request for content may be in the form of an initializing URL address that identifies the content being requested (e.g., using a content identifier) and the initial bitrate for the content being requested by the user device 112. For example, the request for content may include an address for the first segment of the content 202 in the format of http://[origin-fqdn]/[content-identifier]/[segment-bitrate]/.

At 620, a requesting device (e.g., the user device 112) may receive a response (e.g., a redirect notification, such as a response that provides or is indicative of an HTTP 302 redirect to another URL path). For example, the response may be received from a computing device (e.g., the content server 108) via the network 110. The response may be received based on sending the request for the content 202 (e.g., a live or time-shifted transmission of content) to the content server 105. For example, the response may include a URL address, storage location, or other identifier associated with and/or identifying the location of the most recent content segment 204 or another content segment 204 of the content 202 at the bitrate requested by the user device 112 in the request for content. For example, the most recent content segment 204 may be the most recently created content segment 204 of the content 202 being requested by the user device 112. For example, the packager 104 or another computing device may separate the streaming content 202 (e.g., a live stream of content) into content segments 204 in chronological order as the portions of the content transmission 202 are being received by the packager 104. As such, the last content segment 204 to be created by the packager 104 may be the most recent portion, or most recent content segment 204, of the content transmission to be received by the packager 104. For example, the response may be any one or more of an HTTP 302 redirect notification, an HTTP 303 redirect notification, or an HTTP 307 redirect notification. For example, the redirect notification may take the form of an HTTP 302 redirect notification as follows: "HTTP/1.1 302 Found" and the URL address, storage location, or other identifier associated with and/or identifying the location of the most recent content segment may take the form of: "Location: /[content-identifier]/[segment-bitrate]/[segment-number].mp4".

At 630, a requesting device (e.g. the user device 112) may send a second request for the content 202. The second request for the content 202 may comprise a request for the most recent content segment 204 of the content 202 or another content segment. The second request for the content 202 may be sent or otherwise transmitted by the user device 112 to a computing device (e.g., the content server 108) via the network 110. The second request for the content 202 may be associated with the request for the same content 202 at 610. The second request for the content 202 may be received based on receiving the response to the first request for the content 202 from the content server 108. The second request for the content may include the URL address, storage location, or other identifier associated with the most recent content segment 204 or another content segment 204 of the requested content 202 and received with or in the response. For example, the URL address, storage location, or other identifier may identify the location for retrieving the most recent content segment 204 or another content segment 204 of the content 202 at the bitrate requested. For example, the second request for content 202 may include an address for the most recent segment of the content 202 in the format of http://[origin-fqdn]/[content-identifier]/[segment-bitrate]/[segment-number]. mp4.

At 640, a requesting device (e.g., the user device 112) may receive a first content segment 204 of the content 202. For example, the first content segment 204 may be received from a computing device (e.g., the content server 108) via the network 110. For example, the first content segment 204 of the content 202 (e.g., a live or time-shifted content transmission) may be the most recent content segment 204 for the requested content 202 or another content segment 204 for the content 202. The received content segment 204 may include metadata. For example, the content segment 204 may include a message box (e.g., an event message box) that includes all or a portion of the metadata. For example, the message box may be an MPEG-DASH event message box or another type of message box. For example, the metadata may include a content identifier that identifies the content 202. For example, the metadata may include a content segment identifier that identifies the next content segment in time (i.e., the next sequential content segment in chronological order) after the received content segment 204. For example, the content segment identifier of the next content segment in time may be a segment number, full or partial URL address for the next content segment in time, or another unique identifier for the particular next content segment in time. For example, the metadata in the most recent content segment 204 may include one or more available bitrates for receiving the next content segment in time (i.e., the next sequential content segment in chronological order) after the most recent content segment 204. For example, the metadata in the most recent content segment 204 may include a full or partial address (e.g., URL address) for the next content segment in time (i.e., the next sequential content segment in chronological order) after the most recent content segment 204 for the requested content.

At 650, a requesting device (e.g., the user device 112) may determine metadata provided with the received content segment 204 for the requested content 202 (e.g., live stream content). For example, the user device 112 may parse the received content segment 204 to retrieve the metadata. For example, the user device 112 may parse the packet of the received content segment to access a message box (e.g., an event message box, such as an MPEG-DASH event message box) containing all or a portion of the metadata. In other examples, the metadata may be provided in another portion of the received content segment 204. For example, the metadata may include a content identifier that identifies the content 202. The metadata may include, for example, a content segment identifier of the next content segment in time (i.e., the next sequential content segment in chronological order) after the received content segment 204. For example, the content segment identifier of the next content segment in time may be a segment number, a full or partial URL address for the next content segment in time, or another unique identifier for the particular next content segment in time. For example, the metadata in the received content segment 204 may include one or more available bitrates for receiving the next content segment in time (i.e., the next sequential content segment in chronological order) after the most recently received content segment 204.

At 660, a requesting device (e.g., the user device 112) may determine a request for the next content segment 204 (e.g. the next sequential content segment in chronological order) for the requested content 202. For example, the request for the next content segment 204 may be determined based on the metadata in the most recently received content segment 204. For example, user device 112 may determine the request for the next content segment 204 based on one or more of the content identifier, the content segment identifier of the next sequential content segment 204 or the available bitrates for the next sequential content segment 204 within the metadata. For example, the user device 112 may determine the request for the next content segment 204 by generating or constructing a request for the next content segment 204. For example, the user device 112 may retrieve or receive the content identifier from the metadata of the most recently received content segment 204 by the user device 112. For example, the user device 112 may retrieve or receive the content segment identifier (e.g., segment number, full or partial URL address, or other identifier) for the next content segment 204 from the metadata of the most recently received content segment 204 by the user device 112. The user device may also retrieve or receive one of the available bitrates for the next content segment 204 from the metadata of the most recently received content segment 204 by the user device 112. The user device 112 may generate or construct the request for the next content segment 204 based on the content identifier, the content segment identifier (e.g., segment number, full or partial URL address, or other identifier) of the next content segment, and the selected available bitrate. For example, the request for the next content segment 204 may take the form of a URL address. For example, the URL address for the request for the next content segment 204 may take the form of http://[origin-fqdn]/[content-identifier]/next-segment-bitrate]/[next-segment-number]. mp4.

At 670, a requesting device (e.g., the user device 112) may send or otherwise transmit the request for the next content segment 204 for the requested content 202 (e.g., a live stream of content). The request for the next content segment 204 may be sent or transmitted to a computing device (e.g., the content server 108 via the network 110. As additional content segments 204 for the content 202 are received by the user device 112, the user device 112 may repeat 640-670 to receive the next segment 204 of the content 202, identify information for requesting the next sequential content segment 204, determine the request for that next sequential content segment 204, and send the request for that next sequential content segment 204 until the stream of content 202 ends or the user device 112 disconnects from the content transmission 202.

Figure 7:
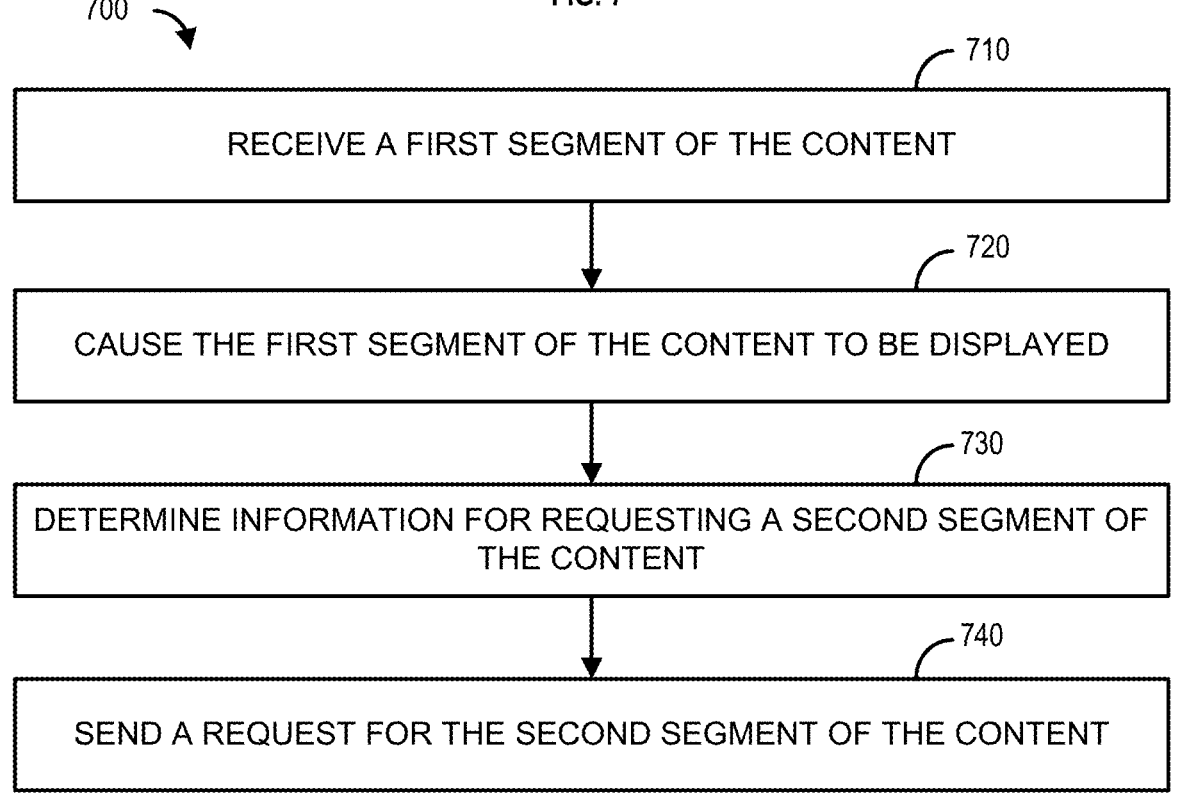
FIG. 7 shows a flowchart of an example method for determining a next segment of a content transmission to request.

FIG. 7 shows a flowchart of an example method 700 for determining a next content segment 204 of content 202 to request. For example, the content 202 (e.g., one or more content items, programs, shows, etc.) may be a live or time-shifted content transmission (e.g., sporting event, concert, news, weather, etc.). The content 202 may be available to receive and display at one or a plurality of bitrates at a requesting device (e.g., the user device 112). The content 202 may be partitioned or separated into a plurality of content segments for sending or otherwise transmitting by a computing device (e.g., the content server 108) to the user device 112.

A requesting device (e.g., the user device 112) may send a request for content 202. The request for content 202 may be sent or otherwise transmitted by the user device 112 via the network 110 to a computing device (e.g., the content server 108). The user device 112 may receive a response (e.g., a redirect notification, such as a response that provides or is indicative of an HTTP 302 redirect to another URL path). For example, the response may be received from a computing device (e.g., the content server 108) via the network 110. For example, the response may include a URL address, storage location, or other identifier associated with and/or identifying the location of the most recent content segment 204 (e.g., the first content segment) or another content segment 204 of the content 202 at the bitrate requested by the user device 112 in the request for content. For example, the response may be any one or more of an HTTP 302 redirect notification, an HTTP 303 redirect notification, or an HTTP 307 redirect notification. For example, the redirect notification may take the form of an HTTP 302 redirect notification as follows: "HTTP/1.1 302 Found" and the URL address, storage location, or other identifier associated with and/or identifying the location of the most recent content segment may take the form of: "Location: /[content-identifier]/[segment-bitrate]/[segment-number].mp4". For example, the most recent content segment 204 may be the most recently created content segment 204 of the content 202 being requested by the user device 112. For example, the packager 104 or another computing device may separate the streaming content 202 (e.g., a live stream of content) into content segments 204 in chronological order, and the last content segment 204 to be created by the packager 104 may be the most recent portion, or most recent content segment 204 available to be received by the user device 112.

The user device 112 may send a second request for the content 202, which may comprise a request for the most recent content segment 204 (e.g., the first segment of the content). Note the use of first in "first segment of the content" is not intended to denote the very first segment of the content but is instead only intended for identification of one segment from another segment. The second request for the content 202 may be sent or otherwise transmitted by the user device 112 to the content server 108 via the network 110. The second request for the content 202 may be for the same content 202 as requested in the first request. The second request for the content may include the URL address, storage location, or other identifier associated with the most recent content segment 204 (e.g., the first content segment) of the requested content 202 and received with or in the response. For example, the URL address, storage location, or other identifier may identify the location for retrieving the first segment of the content 202 at the bitrate requested. For example, the second request for content 202 may include an address for the first segment of the content 202 in the format of http://[origin-fqdn]/[content-identifier]/[segment-bitrate]/[segment-number].mp4.

At 710, the first segment 204 of the content 202 may be received. For example, the first segment 204 of the content 202 may be received by the user device 112 from the content server 108 via the network 110. For example, the first segment 204 of the content 202 may be the most recent content segment 204 (e.g., the latest content segment of the content 202 created and available for transmission to user devices).

At 720, the first segment 204 of the content 202 may be caused to be displayed. For example, the user device 112 may cause the first segment 204 of the content 202 to be displayed. For example, the user device may cause the first segment 204 of the content to be displayed by displaying the first segment of the content on a display of or associated with the first device (e.g., a display directly or indirectly coupled to the user device 112. For example, the user device 112 may cause the first segment 204 of the content 202 to be displayed by sending the first segment of the content to a separate display device for display.

At 730, information for requesting a second segment of the content 202 may be determined. For example, the information may be determined by the user device 112 or another computing device. For example, the second segment of the content 202 may be the next segment sequentially in line (i.e., the very next segment of the content in time after the first segment 204 of the content 202) or another segment of the content (e.g., when a skip operation is employed).

For example, the information may be determined from information included in the first segment of the content. The first segment 204 of the content 202 may include metadata. For example, the information may be in the metadata of the first segment 204 instead of in a manifest associated with or optionally provided with the first segment 204. For example, the metadata of the first segment 204 of the content 202 may include information for requesting the next-in-line segment of the content 202 following the first segment 204 of the content 202 (e.g., the second segment of the content 202) or another segment of the content 202. For example, the information may include a content segment identifier that identifies the next content segment (e.g., by segment number) in time (i.e., the next sequential content segment in chronological order) after the received first content segment 204 (e.g., the second segment of the content). For example, the content segment identifier of the next content segment in time may be a segment number, a full or partial URL address for the next content segment in time, or another unique identifier for the particular next content segment in time. For example, the information may include a content identifier that identifies the content 202. For example, the information in the first segment 204 of content 202 may include one or more available bitrates for receiving the second segment of the content 202 (i.e., the next sequential content segment in chronological order) after the first segment 204 of the content 202. For example, the metadata in the first content segment 204 may include a full or partial address (e.g., URL address) for the next content segment in time (i.e., the next sequential content segment in chronological order) (e.g., the second segment of the content 202 after the first segment 204 for the requested content 202.

For example, the metadata may comprise a message box (e.g., an event message box) that includes all or a portion of the information for requesting the next segment of the content. For example, the user device 112 may parse the received content segment 204 to retrieve the metadata. For example, the user device 112 may parse the packet of the received content segment to access the message box containing all or a portion of the metadata, including the information for requesting the next segment of the content 202. For example, the message box may be an MPEG-DASH event message box or another type of message box. For example, the message box may be included within the segment of the content. In other examples, the information may be provided in another portion of the received content segment 204. For example, the message box may be included in a header or payload of a packet comprising the segment of the content 202.

For example, each segment of the content 202 may include the information, as described above, for requesting the next sequential segment, in chronological order, for the content. As such, the user device 112 may obtain the information for requesting the next segment of the content, such as content identifier, bitrate, and/or URL address, from the currently received segment of the content rather than a manifest. Accordingly, fewer or no manifests may need to be sent to the user device 112 for determination of how to request the segments of the content by the user device 112.

At 740, a requesting device (e.g., the user device 112) may generate and send a request for the next content segment (e.g. the next sequential content segment in chronological order) (e.g., the second segment of the content 202. For example, the request for the second segment may be generated or determined based on the information in the most recently received content segment 204 (e.g., the first segment of the content 202. For example, user device 112 may determine the request for the next content segment based on one or more of the content identifier, the content segment identifier of the next sequential content segment (e.g., the second segment), the available bitrates for the next sequential content segment, or the URL address for the next sequential content segment within the information/metadata. For example, the user device 112 may determine the request for the next content segment by generating or constructing a request for the next content segment. For example, the user device 112 may retrieve or receive the content identifier from the information within or included with the most recently received content segment 204 (e.g., the first segment 204 of the content) by the user device 112. For example, the user device 112 may retrieve or receive the content segment identifier (e.g., segment number, full or partial URL address, or other identifier) for the next content segment from the information of the most recently received content segment 204 by the user device 112. The user device may also retrieve or receive one of the available bitrates for the next content segment from the information of the most recently received content segment 204 by the user device 112. The user device may also retrieve or receive the address (e.g., URL address) for the next content segment from the information of the most recently received content segment 204 by the user device 112. The user device 112 may generate or construct the request for the next content segment 204 (e.g., the second segment of the content 202) based on the content identifier, the content segment identifier (e.g., segment number, full or partial URL address, or other identifier) of the next content segment, the selected available bitrate, and/or the address of the next content segment. For example, the request for the next content segment 204 may take the form of a URL address. For example, the URL address in or of the request for the next content segment 204 may take the form of http://[origin-fqdn]/[content-identifier]/next-segment-bitrate]/[next-segment-number].mp4.

The user device 112 may send or otherwise transmit the request for the next content segment for the requested content 202 (e.g., a live stream or time-shifted transmission of content). The request for the next content segment may be sent or transmitted to the content server 108 via the network 110. As additional content segments for the content 202 are received by the user device 112, the user device 112 may repeat 710-740 to receive the next segment of the content 202, cause the currently received content segment to be displayed, identify information for requesting the next sequential content segment, determine or generate the request for that next sequential content segment, and send the request for that next sequential content segment until the transmission of the content 202 ends or the user device 112 disconnects from the content transmission 202.

Figure 8:
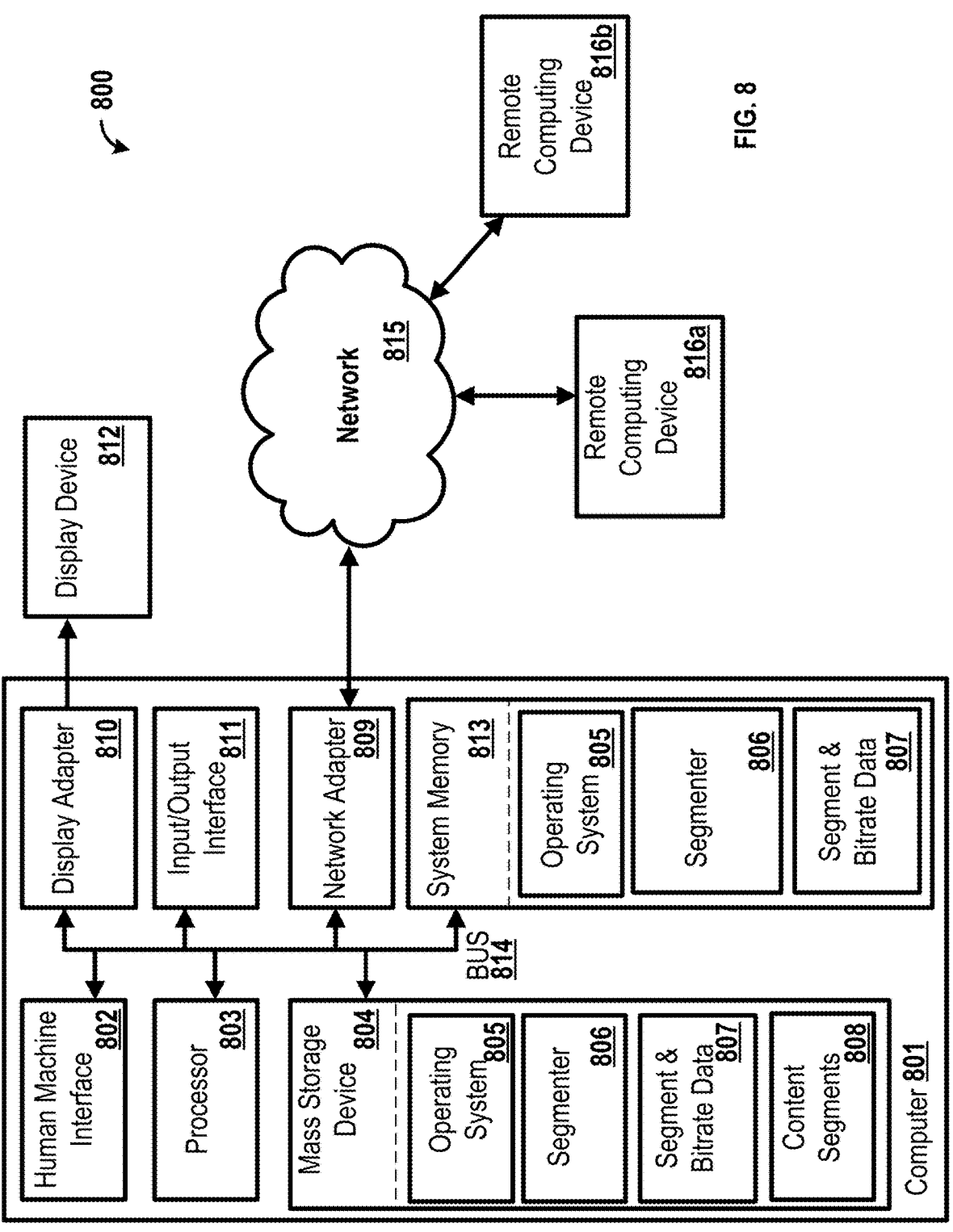
FIG. 8 shows a block diagram of an example computing device for inserting metadata into segmented content and delivering of the streaming content.

FIG. 8 shows an example system 800 for inserting meta-data into streaming content and delivering the streaming content across multiple computing devices. Any device/component described herein (e.g., a computing device, a requesting device, the encoder 103, the packager 104, the segmenter 105, the content server 108, the user device 112) may be a computer 801 as shown in FIG. 8.

The computer 801 may include one or more processors 803, a system memory 813, and a bus 814 that couples various components of the computer 801 including the one or more processors 803 to the system memory 813. In the case of multiple processors 803, the computer 801 may utilize parallel computing.

The bus 814 may include one or more of several possible types of bus structures, such as a memory bus, memory controller, a peripheral bus, an accelerated graphics port, and a processor or local bus using any of a variety of bus architectures.

The computer 801 may operate on and/or include a variety of computer readable media (e.g., non-transitory). Computer readable media may be any available media that is accessible by the computer 801 and includes, non-transitory, volatile and/or non-volatile media, removable and non-removable media. The system memory 813 has computer readable media in the form of volatile memory, such as random access memory (RAM), and/or non-volatile memory, such as read-only memory (ROM). The system memory 813 may store data such as segment data and bitrate data 807 and/or program modules such as an operating system 805 and segmenter 806 that are accessible to and/or are operated on by the one or more processors 803.

The computer 801 may also include other removable/non-removable, volatile/non-volatile computer storage media. The mass storage device 804 may provide non-volatile storage of computer code, computer readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable program-mable read-only memory (EEPROM), and the like.

Any number of program modules may be stored on the mass storage device 804. An operating system 805 and segmenter software 806 may be stored on the mass storage device 804. One or more of the operating system 805 and segmenter software 806 (or some combination thereof) may include program modules for the segmenter software 806. Segment data and/or bitrate data (e.g., the bitrates available for each content segment) 807 may also be stored on the mass storage device 804. Content segments 808 may also be stored in the mass storage device 804. The content segments 808 may include one or more content segments of one or more content transmissions (encoded or unencoded) received by the computer 801. The segment and bitrate data 807 and/or the content segments 808 may be stored in any of one or more databases known in the art. The databases may be centralized or distributed across multiple locations within the network 815.

A user may enter commands and information into the computer 801 via an input device (not shown). Such input devices comprise, but are not limited to, a keyboard, point-ing device (e.g., a computer mouse, remote control), a microphone, a joystick, a scanner, tactile input devices such as gloves, and other body coverings, motion sensor, and the like. These and other input devices may be connected to the one or more processors 803 via a human machine interface 802 that is coupled to the bus 814, but may be connected by other interface and bus structures, such as a parallel port, game port, an IEEE 1394 Port (also known as a Firewire port), a serial port, network adapter 809, and/or a universal serial bus (USB).

A display device 812 may also be connected to the bus 814 via an interface, such as a display adapter 810. It is contemplated that the computer 801 may have more than one display adapter 810 and the computer 801 may have more than one display device 812. A display device 812 may be a monitor, an LCD (Liquid Crystal Display), light-emitting diode (LED) display, television, smart lens, smart glass, and/or a projector. In addition to the display device 812, other output peripheral devices may comprise compo-nents such as speakers (not shown) and a printer (not shown) which may be connected to the computer 801 via Input/Output Interface 811. Any step and/or result of the methods may be output (or caused to be output) in any form to an output device. Such output may be any form of visual representation, including, but not limited to, textual, graphi-cal, animation, audio, tactile, and the like. The display 812 and computer 801 may be part of one device, or separate devices.

The computer 801 may operate in a networked environ-ment using logical connections to one or more remote computing devices 816a, 816b. A remote computing device 816a, 816b may be a personal computer, computing station (e.g., workstation), portable computer (e.g., laptop, mobile phone, tablet device), smart device (e.g., smartphone, smart-watch, activity tracker, smart apparel, smart accessory), security and/or monitoring device, a server, a router, a network computer, a peer device, edge device or other common network nodes, and so on. Logical connections between the computer 801 and a remote computing device 816a, 816b may be made via a network 815, such as a local area network (LAN) and/or a general wide area network (WAN). Such network connections may be through a net-work adapter 809. A network adapter 809 may be imple-mented in both wired and wireless environments. Such networking environments are conventional and common-place in dwellings, offices, enterprise-wide computer net-works, intranets, and the Internet.

Application programs and other executable program com-ponents such as the operating system 809 are shown herein as discrete blocks, although it is recognized that such programs and components may reside at various times in different storage components of the computing device 801, and are executed by the one or more processors 803 of the computer 801. An implementation of segmenter software 806 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible nonexpress basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a computing device, content;
separating the content into a plurality of content segments;
inserting, into an event message box of at least one content segment of the plurality of content segments, metadata comprising a segment identifier identifying a next sequential content segment of the plurality of content segments and at least one indicator of available bitrates for the next sequential content segment of the plurality of content segments; and
sending, to a user device requesting the content, the at least one content segment of the plurality of content segments comprising the metadata comprising the segment identifier identifying the next sequential content segment of the plurality of content segments and the indicator of the available bitrates.

2. The method of claim 1, wherein the metadata further comprises a plurality of available bitrates for receiving the next sequential content segment of the plurality of content segments.

3. The method of claim 1, wherein the segment identifier comprises a segment number.

4. The method of claim 1, wherein inserting the metadata comprises:
generating, for the at least one content segment of the plurality of content segments, the event message box; and
inserting the metadata into the event message box.

5. The method of claim 1, wherein the content comprises a live stream of content.

6. The method of claim 1, further comprising:
receiving a request for the content;
determining, based on the request, a most recent segment of the content; and
generating, based on the most recent segment of the content, a response.

7. The method of claim 6, further comprising:
receiving a second request for the content;
determining, based on the second request, a requested segment of the content; and
sending, to the user device, the requested segment of the content.

8. The method of claim 1, wherein separating the content into the plurality of content segments comprises assigning a unique identifier to the at least one content segment of the plurality of content segments, wherein the segment identifier comprises the unique identifier.

9. The method of claim 1, wherein separating the content into the plurality of content segments comprises separating a live stream of content into the plurality of content segments, wherein the at least one content segment of the plurality of content segments comprises a portion of the content.

10. A method comprising:
receiving, by a computing device, content;
separating the content into a plurality of content segments;
inserting, into at least one content segment of the plurality of content segments, metadata comprising a segment identifier identifying a next sequential content segment of the plurality of content segments and at least one bitrate for receiving the next sequential content segment of the plurality of content segments; and
sending, to a user device requesting the content, the at least one content segment of the plurality of content segments comprising the metadata comprising the segment identifier identifying the next sequential content segment and the at least one bitrate for receiving the next sequential content segment of the plurality of content segments.

11. The method of claim 10, wherein the segment identifier comprises a segment number for the next sequential content segment of the plurality of content segments.

12. The method of claim 10, wherein inserting the metadata comprises:
generating, for the at least one content segment of the plurality of content segments, an event message box; and
inserting the metadata into the event message box.

13. The method of claim 10, wherein the content comprises a live stream of content.

14. The method of claim 10, further comprising:
determining, based on receiving a request for the content, a most recent segment of the content.

15. The method of claim 14, wherein the request comprises a segment number for the most recent segment of the content.

16. The method of claim 10, wherein separating the content into the plurality of content segments comprises assigning a segment number to the at least one content segment of the plurality of content segments.

17. A method comprising:
receiving, by a user device, a first segment of content;
causing the first segment of the content to be displayed;
determining, by the user device and in an event message box associated with the first segment of the content, a segment identifier identifying a next sequential content segment of the content and at least one indicator of available bitrates for the next sequential content segment in metadata of the first segment of the content; and
sending, based on the metadata, a request for the next sequential content segment of the content at one of the available bitrates.

18. The method of claim 17, wherein determining the segment identifier identifying the next sequential content segment of the content in the metadata further comprises determining an address for the next sequential content segment of the content within the metadata of the first segment of the content.

19. The method of claim 17, wherein causing the first segment of the content to be displayed comprises one or more of displaying the first segment of the content on a display associated with the user device or sending the first segment of the content to a display device for displaying the first segment of the content.

20. The method of claim 17, wherein the segment identifier comprises a segment number.

\* \* \* \* \*